United States Patent
Östergård et al.

(10) Patent No.: US 6,926,418 B2
(45) Date of Patent: Aug. 9, 2005

(54) INTEGRATED LIGHT-GUIDE AND DOME-SHEET FOR KEYBOARD ILLUMINATION

(75) Inventors: Toni Östergård, Turku (FI); Terho Kaikuranta, Piispanristi (FI); Bror Svarfvar, Kaarina (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/132,666

(22) Filed: Apr. 24, 2002

(65) Prior Publication Data

US 2003/0202336 A1 Oct. 30, 2003

(51) Int. Cl.[7] .................................................. H04M 1/22
(52) U.S. Cl. .............................. 362/24; 362/26; 362/31; 362/577
(58) Field of Search ........................... 362/24, 31, 551, 362/558, 360, 85, 26, 559, 560, 577; 345/170; 200/314, 512, 513, 514, 313

(56) References Cited

U.S. PATENT DOCUMENTS

| | | | | |
|---|---|---|---|---|
| 4,197,439 A | * | 4/1980 | Mecklenburg et al. | 200/159 |
| 5,664,667 A | * | 9/1997 | Kenmochi | 200/314 |
| 5,669,486 A | * | 9/1997 | Shima | 200/314 |
| 5,711,588 A | * | 1/1998 | Rudisill | 362/30 |
| 5,871,088 A | * | 2/1999 | Tanabe | 200/514 |
| 5,975,711 A | * | 11/1999 | Parker et al. | 362/24 |
| 6,246,169 B1 | * | 6/2001 | Pruvot | 313/506 |
| 6,369,801 B2 | * | 4/2002 | Boireau et al. | 345/169 |
| 6,670,750 B2 | * | 12/2003 | Hanahara et al. | 313/511 |

FOREIGN PATENT DOCUMENTS

WO   WO 0123805   4/2001   ............ F21V/8/00

* cited by examiner

Primary Examiner—Sandra O'Shea
Assistant Examiner—Sharon Payne
(74) Attorney, Agent, or Firm—Ware, Fressola, Van Der Sluys & Adolphson LLP (57) ABSTRACT

An integrated light guide for use in an electronic device having a plurality of key buttons to allow a user to input signals in the device, the light guide having a plurality of domes used as touch areas of the key buttons and a plurality of light escapement areas disposed at the domes. When coupled to a light source, a portion of the light received by the light guide from the light source escapes from the light escapement areas to illuminate the key buttons. Preferably, each dome has one or more electrically conducting patches provided under the dome such that when a touch area is pushed by the user, these patches are caused to interact with an electronic circuit placed under the light guide for activating a key.

41 Claims, 7 Drawing Sheets

INTEGRATED LIGHT-GUIDE AND DOME-SHEET FOR KEYBOARD ILLUMINATION

FIELD OF THE INVENTION

The present invention relates generally to an illumination system for illuminating the keys or push buttons on a hand-held electronic device, such as a mobile phone, and, more particularly, to a light-guide using total internal reflection to distribute light received from a light source to reach those keys and push buttons.

BACKGROUND OF THE INVENTION

Hand-held electronic devices, such as mobile phones, personal digital assistant (PDA) devices and Communicator devices, have an illuminated user-interface so that the user-interface can be viewed and used by a user even when natural lighting is inadequate. One of the most common ways is to use a plurality of light-emitting diodes (LEDs) to separately illuminate different areas of the user interface. The use of multiple LEDs for illumination causes a significant drain on the power source available to the electronic device. In particular, when a lambertian emitting LED is used to illuminate an area of the user interface, only a small fraction of the power provided electrically to the LED actually transfers to the optical power reaching that area. Moreover, guiding this optical power efficiently to the illuminated area is very difficult. In general, the LED illuminates through a range of angles that casts light on a large area near the keypad. As a result, the waste in the electrical power provided to the LEDs is significant. Nousiainen (WO 01/23805 A1) provides a solution to the user-interface illumination problem. As disclosed in Nousiainen, a light guide, based on total internal reflection, is used to distribute light received from a single light source throughout the light guide, and a plurality of step-like surfaces are used to convey portions of the optical power to the illuminated areas via total internal reflection at the step-like surfaces.

While the light guide, as disclosed in Nousianien, provides an efficient way for illuminating a user interface, the thickness of the light guide is reduced every time a step is made to provide the step-like surface and, therefore, the light guide generally becomes thinner and thinner as the illuminated areas are located further and further away from the light source. In an electronic device having many separate illuminated areas, the thickness of the light guide will become very uneven in that some sections of the light guide may be too thick, while the other sections may be too thin. Disposing such a light guide in a small hand-held device may be difficult. Furthermore, the light guide and the user-interface are separate elements. Thus, it is advantageous and desirable to provide a keyboard illumination system where the light guide and user-interface are integrated.

SUMMARY OF THE INVENTION

The present invention combines a light guide and a dome sheet into a light-dome. The light-dome has a plurality of domes serving as touch areas of the key buttons in a keyboard or keypad. The light-dome further comprises a plurality of light escapement surfaces provided at the touch areas. When the light dome is coupled to a light source to receive a portion of the light provided by the light source, the key buttons are illuminated by part of the received light escaped from the dome sheet at the light escapement surfaces.

Accordingly, the first aspect of the present invention is a light guide for use in a hand-held electronic device having an electronic circuit, a plurality of keys to allow a user to input signals to the electronic device via the electronic circuit, and a light source capable of providing light to illuminate the device. The light guide comprises:

an optically transparent sheet, disposed adjacent to the electronic circuit, having a first boundary interface, and a second boundary interface facing the electronic circuit, the sheet adapted to receiving at least a portion of the light provided by the light source so as to allow the received light to propagate in the sheet between the first and second boundary interfaces, wherein the sheet is coupled to a plurality of touch members defining the keys, and wherein the sheet has a plurality of light escapement surfaces disposed at the touch members to allow a portion of the received light to escape from the sheet for illuminating the keys.

According to the preferred embodiment of present invention, the sheet is disposed above the electronic circuit, the first boundary interface is an upper boundary interface and the second boundary interface is a lower boundary interface facing the electronic surface, wherein at least one of the touch members is an integral part of the sheet, said at least one of the touch members having an upper surface and a lower surface extending from the respective boundary interfaces of the sheet for allowing the received light to enter into said at least one of the touch members and propagate therethrough between the upper and lower surfaces.

Preferably, each of the touch members has a dome shape protruding above the upper boundary interface of the sheet, and a light escapement surface is disposed at each touch area. The light escapement surface can be provided on the upper surface or the lower surface of the dome.

Preferably, each of the touch members has electrically conducting areas capable of interacting with the electronic circuit for activating the keys when the user touches the touch members. Preferably, the touch members are flexible to allow the user to push the touch members toward the electronic circuit for activating the keys.

According to the present invention, the light escapement surface may comprise a diffuse surface, a diffractive surface or a plurality of microlenses. The light escapement surface may also be reflective.

It is possible that the touch members are separate buttons, each having a protruded segment and an electrically conducting base, and the sheet has a plurality of apertures for engaging with the protruding segments of the touch member. The aperture has a peripheral surface joining the upper and lower boundary interfaces of the sheet to provide a light escapement surface for allowing a portion of the received light to escape through the peripheral surface to illuminate the protruding segment.

It is also possible that the sheet comprises a plurality of apertures and each of the touch members comprises a curved cover disposed above each aperture. The aperture has a peripheral surface joining the upper and lower boundary interfaces of the sheet to provide a light escapement surface for allowing a portion of the received light to escape through the peripheral surface to illuminate the curved cover. Advantageously, the curved cover has an electrically conducting lower surface capable of interacting with the electronic circuit for activating the key when the user touches the curved cover.

According to the present invention, the light guide can be disposed below the electronic circuit for illuminating the electronic circuit from below when the electronic circuit is made on a transparent or translucent substrate, wherein the first boundary interface is a lower boundary interface and the second boundary interface is an upper boundary interface.

The second aspect of the present invention is a hand-held electronic device, such as a mobile terminal, having an electronic circuit, a plurality of keys to allow a user to input signals to the electronic device via the electronic circuit, and a light source capable of providing light to illuminate the device. The hand-held electronic device comprises:

a light-guide coupled to the light source to receive light provided by the light source, wherein the light-guide comprises an optically transparent sheet disposed adjacent to the electronic circuit, having a first boundary interface and a second boundary interface facing the electronic circuit, allowing the received light to propagate in the sheet between the first and second boundary interfaces, wherein the sheet is coupled to a plurality of touch members defining the keys, and wherein the sheet has a plurality of light escapement surfaces disposed at the touch members to allow part of the received light to escape from the sheet for illuminating the keys.

According to the preferred embodiment of the present invention, the sheet is disposed above the electronic circuit, the first boundary interface is an upper boundary interface and the second boundary interface is a lower boundary interface facing the electronic surface, wherein at least one of the touch members is an integral part of the sheet, said at least one of the touch members having an upper surface and a lower surface extending from the respective boundary interfaces of the sheet for allowing the received light to enter into said at least one of the touch members and propagate therethrough between the upper and lower surfaces.

Preferably, each of the touch members has a dome shape protruding above the upper boundary interface of the sheet, and a light escapement surface is disposed at each touch area. The light escapement surface can be provided on the upper surface or the lower surface of the dome. Preferably, each of the touch members has one or more electrically conducting areas disposed in the lower surface. The electronically conducting areas are capable of interacting with the electronic circuit for activating the keys when the user touches the touch members.

According to the present invention, the light escapement surface may comprise a diffuse surface, a diffractive surface or a plurality of microlenses. The light escapement surface may also be reflective.

It is possible that the touch members are separate buttons, each having a protruded segment and an electrically conducting base, and the sheet has a plurality of apertures for engaging with the protruding segments of the touch member. The aperture has a peripheral surface joining the upper and lower boundary interfaces of the sheet to provide a light escapement surface for allowing part of the received light to escape through the peripheral surface to illuminate the protruding segment.

It is also possible that the sheet comprises a plurality of apertures and each of the touch members comprises a curved cover disposed above each aperture. The aperture has a peripheral surface joining the upper and lower boundary interfaces of the sheet to provide a light escapement surface for allowing a portion of the received light to escape through the peripheral surface to illuminate the curved cover. Preferably, the curved cover has an electrically conducting area capable of interacting with the electronic circuit for activating the key when the user touches the curved cover.

According to the present invention, the light guide can be disposed below the electronic circuit for illuminating the electronic circuit from below when the electronic circuit is made on a transparent or translucent substrate, wherein the first boundary interface is a lower boundary interface and the second boundary interface is an upper boundary interface.

The third aspect of the present invention is a method of illumination for use in a hand-held electronic device having an electronic circuit, a plurality of keys for allowing a user to input signals to the electronic device via the electronic circuit, and a light source capable of providing light to illuminate the electronic device. The method comprising the steps of:

providing an optically transparent sheet, disposed adjacent to the electronic circuit;

optically coupling the sheet to the light source to receive a portion of the light provided by the light source, wherein the sheet has a first boundary interface and a second boundary interface facing the electronic circuit to allow the received light to propagate in the sheet between the first and second boundary interfaces, and the sheet is coupled to a plurality of touch members defining the keys; and providing a plurality of light escapement surfaces at the touch members to allow part of the received light to escape from the sheet for illuminating the keys.

According to the preferred embodiment of the present invention, the sheet is disposed above the electronic circuit, the first boundary interface is an upper boundary interface and the second boundary interface is a lower boundary interface facing the electronic surface, wherein at least one of the touch members is an integral part of the sheet, said at least one of the touch members having an upper surface and a lower surface extending from the respective boundary interfaces of the sheet for allowing the received light to enter into said at least one of the touch members and propagate therethrough between the upper and lower surfaces.

Preferably, each of the touch members has a dome shape protruding above the upper boundary interface of the sheet, and a light escapement surface is disposed at each touch area. The light escapement surface can be provided on the upper surface or the lower surface of the dome. Preferably, each of the touch members has one or more electrically conducting areas disposed in the lower surface. The electronically conducting areas are capable of interacting with the electronic circuit for activating the keys when the user touches the touch members.

According to the present invention, the light escapement surface may comprise a diffuse surface, a diffractive surface or a plurality of microlenses. The light escapement surface may also be reflective.

It is possible that the touch members are separate buttons each having a protruded segment and an electrically conducting base, and the sheet has a plurality of apertures for engaging with the protruding segments of the touch member. The aperture has a peripheral surface joining the upper and lower boundary interfaces of the sheet to provide a light escapement surface for allowing part of the received light to escape through the peripheral surface to illuminate the protruding segment.

It is also possible that the sheet comprises a plurality of apertures and each of the touch members comprises a curved cover disposed above each aperture. The aperture has a peripheral surface joining the upper and lower boundary interfaces of the sheet to provide a light escapement surface for allowing a portion of the received light to escape through the peripheral surface to illuminate the curved cover. Preferably, the curved cover has an electrically conducting area capable of interacting with the electronic circuit for activating the key when the user touches the curved cover.

According to the present invention, the light guide can be disposed below the electronic circuit for illuminating the electronic circuit from below when the electronic circuit is made on a transparent or translucent substrate, wherein the first boundary interface is a lower boundary interface and the second boundary interface is an upper boundary interface.

The present invention will become apparent upon reading the description taken in conjunction with FIGS. 1 to 8b.

BEST MODE TO CARRY OUT THE INVENTION

Figure 1:
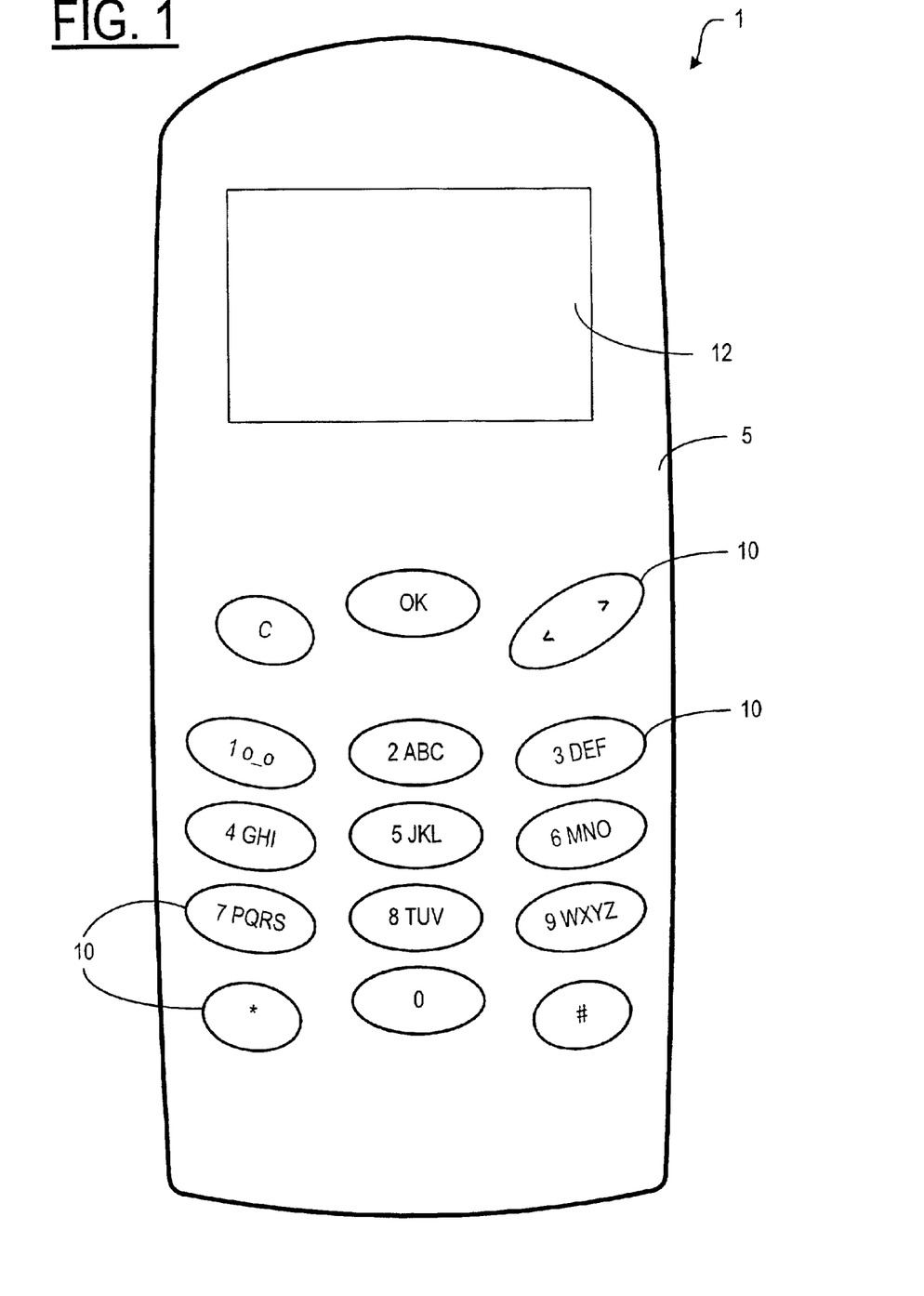
FIG. 1 is a top view showing a mobile terminal having a plurality of keys to be illuminated by a light-guide, according to the present invention.
Figure 2:
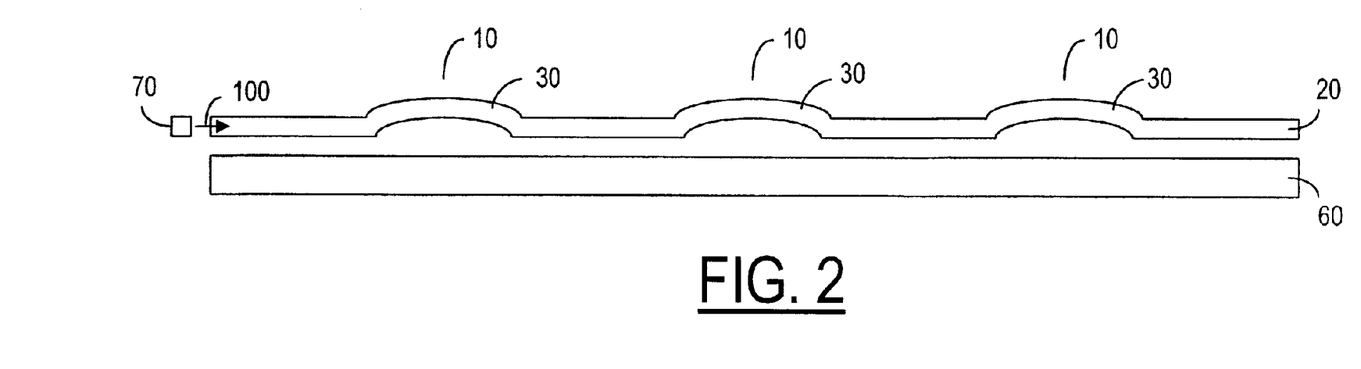
FIG. 2 is a cross-sectional view showing the preferred embodiment of the light guide, according to the present invention.
Figure 3:
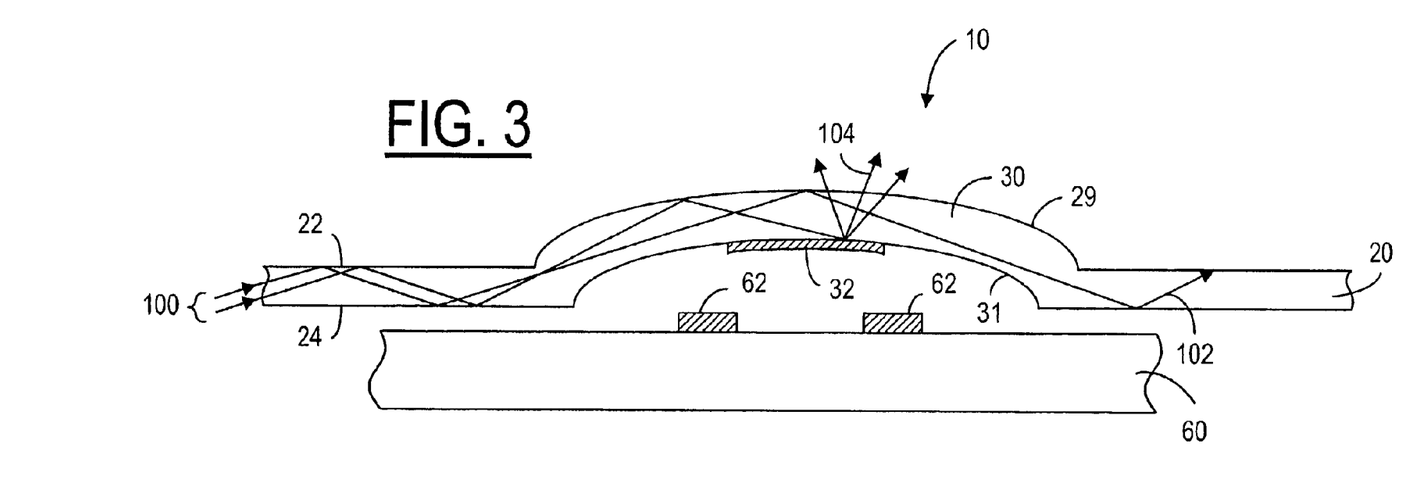
FIG. 3 is a cross-sectional view showing a dome used as the contact surface of a key and a light escapement area on the dome surface.
Figure 4:
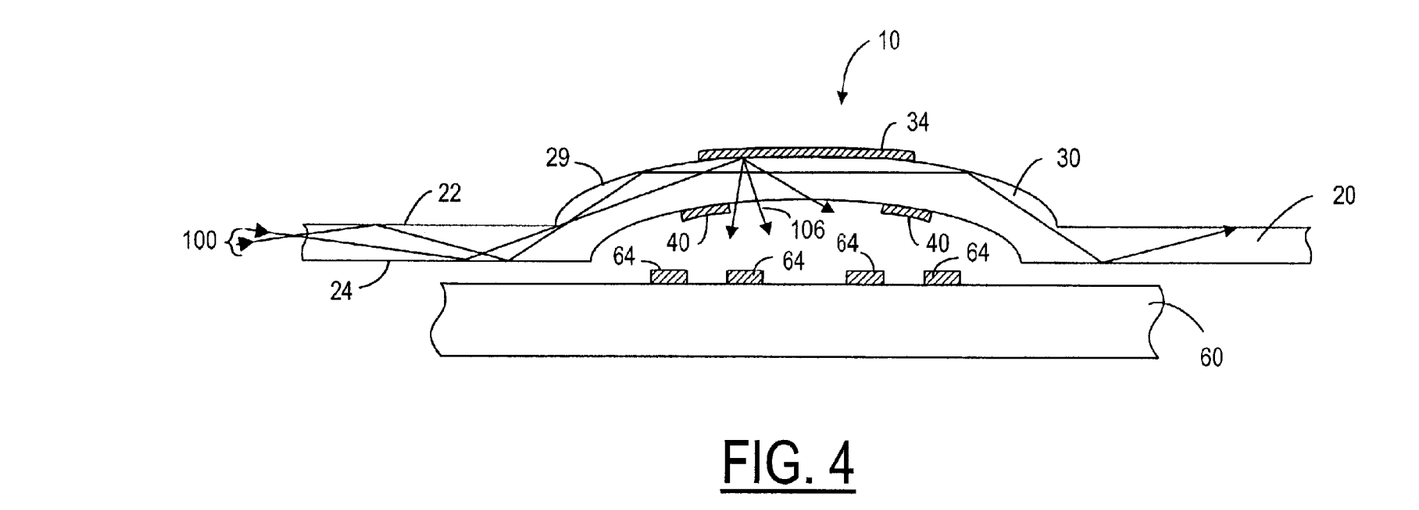
FIG. 4 is a cross-sectional view showing another light escapement area on the dome surface.
Figure 5A:
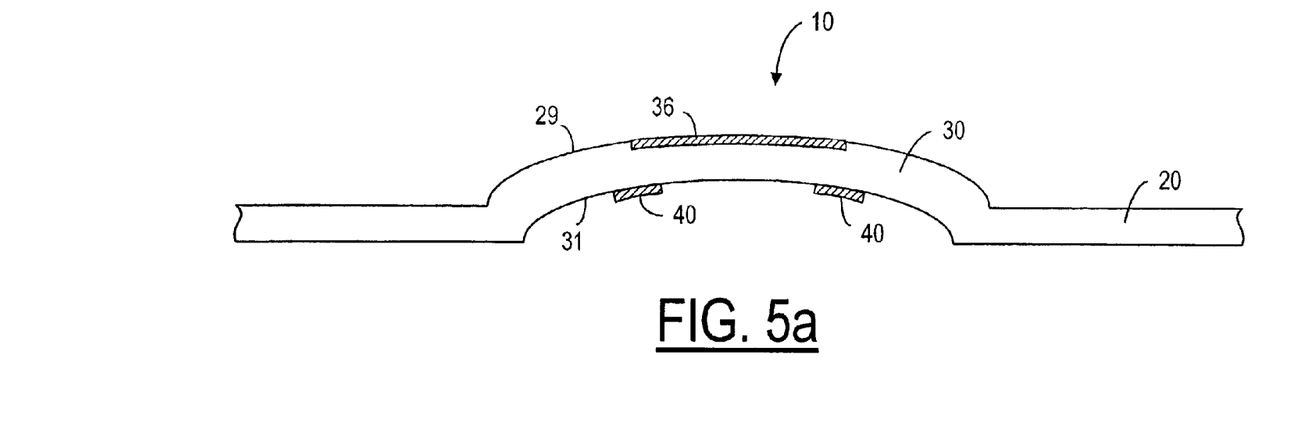
FIG. 5a is a cross-sectional view showing yet another light escapement area on the dome surface.
Figure 5B:
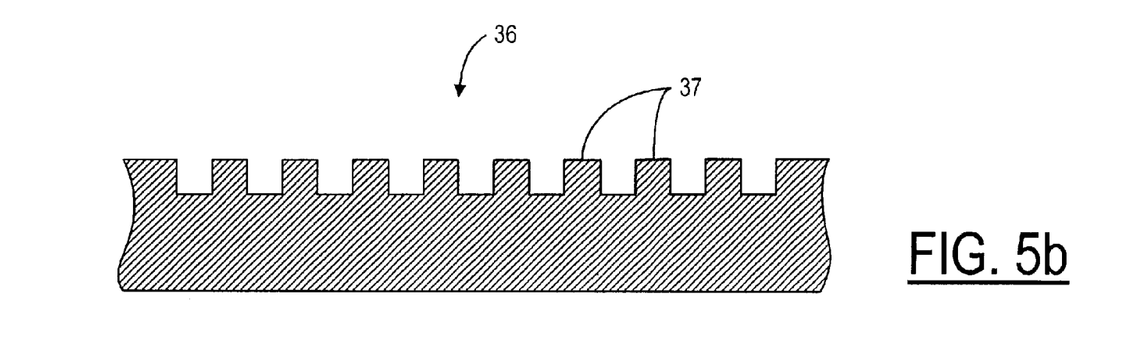
FIG. 5b is a schematic representation showing a diffractive element being used as a light escapement area.

A hand-held electronic device, such as a mobile terminal 1, as shown in FIG. 1, has a cover 5 with a plurality of input keys or key buttons 10 and a display 12. It is preferred that the key buttons 10 be illuminated by an internal light source so that a user can view and use the key buttons 10 even when the natural lighting is inadequate. In order to illuminate the key buttons 10, the present invention uses a light guide 20 adapted to receiving light 100 from a light source 70, as shown in FIG. 2. The present invention integrates the light guide with a dome-sheet to provide a light dome. As shown in FIG. 2, the light guide 20 has a plurality of domes 30, which define the keys 10. The light guide 20 is disposed on top of an electronic circuit 60 in the mobile terminal 1 to allow a user to input signals to the mobile terminal 1 via the electronic circuit 60 by touching the keys 10. As shown in FIG. 3, the light guide 20 has an upper boundary interface 22 and a lower boundary interface 24 to allow light 100 received from the light source 70 to propagate in the sheet between the upper and lower boundary interfaces. The light guide 20 has a plurality of light escapement surfaces 32 to allow a portion of the received light 100 to escape from the light guide 20, as indicated by reference numeral 104. The light guide 20 is sufficiently flexible such that when a user pushes the dome 30 downward in order to activate a key 10, the lower surface of the dome 30 can make contact with the electronic circuit 60. As shown in FIG. 3, each dome 30 is used as a touch area of a key button 10. The light escapement surface 32 is provided on the lower surface 31 of the dome 30 to break the total internal reflection at a section of the lower surface 31. Preferably, the light escapement surface 32 is reflective to increase the reflection through the upper boundary interface 22. Furthermore, it is preferable that the light escapement surface 32 be electrically conductive so that when the dome 30 is pushed downward, the electrically conductive area of the light escapement surface 32 can interact with the electrical contact areas 62 on the electronic circuit 60 for activating the corresponding key 10. Thus, it is possible that the light escapement surface 32 is printed with metal paint, for example. The light escapement surface 32 can be a diffusive surface, but it can also comprise a diffractive surface or a plurality of microlenses. Alternatively, the light escapement area 34 can be provided on the upper surface 29 of the dome 30, as shown in FIG. 4. Again, the light escapement surface 34 on the upper surface of the dome 30 can be a reflective diffuser, which spreads out reflected light 106 downward through the lower boundary interface 24. Preferably, a plurality of metal contacts 40 are provided on the lower surface of the dome 30 for making electrical contact with the electrical contact areas 64 on the electronic circuit 60. Moreover, the light escapement surface 34 can comprise a plurality of the microlenses, or a diffractive surface 36, as shown in FIGS. 5a and 5b. A diffractive surface, which typically includes a plurality of diffractive grooves 37 formed on the upper or lower surface of the dome, is known in the art.

Figure 6:
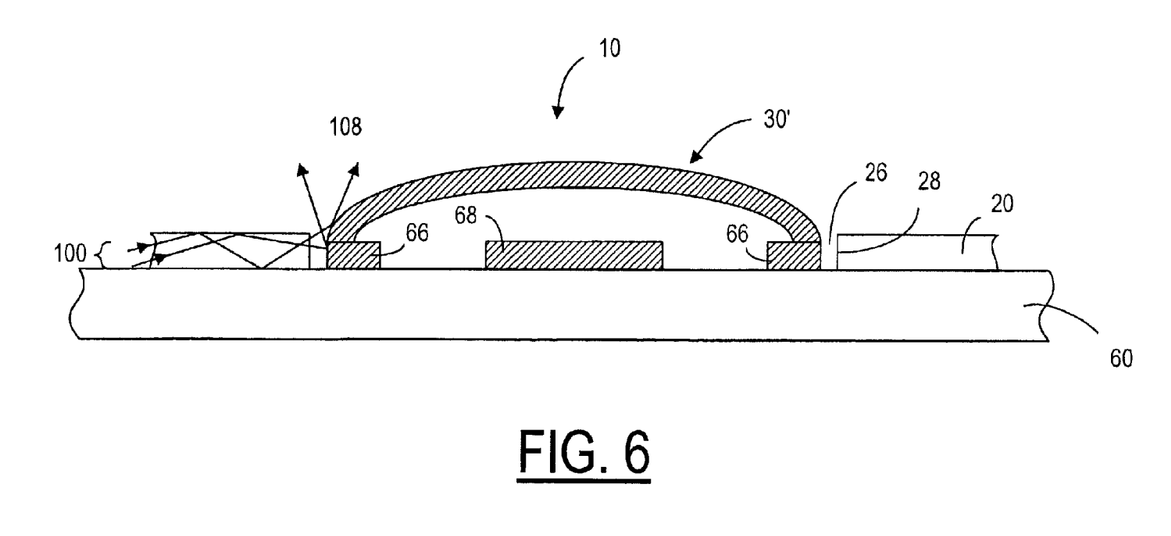
FIG. 6 is a schematic representation showing a dome having a metal base being used as the touching area of a key.
Figure 7:
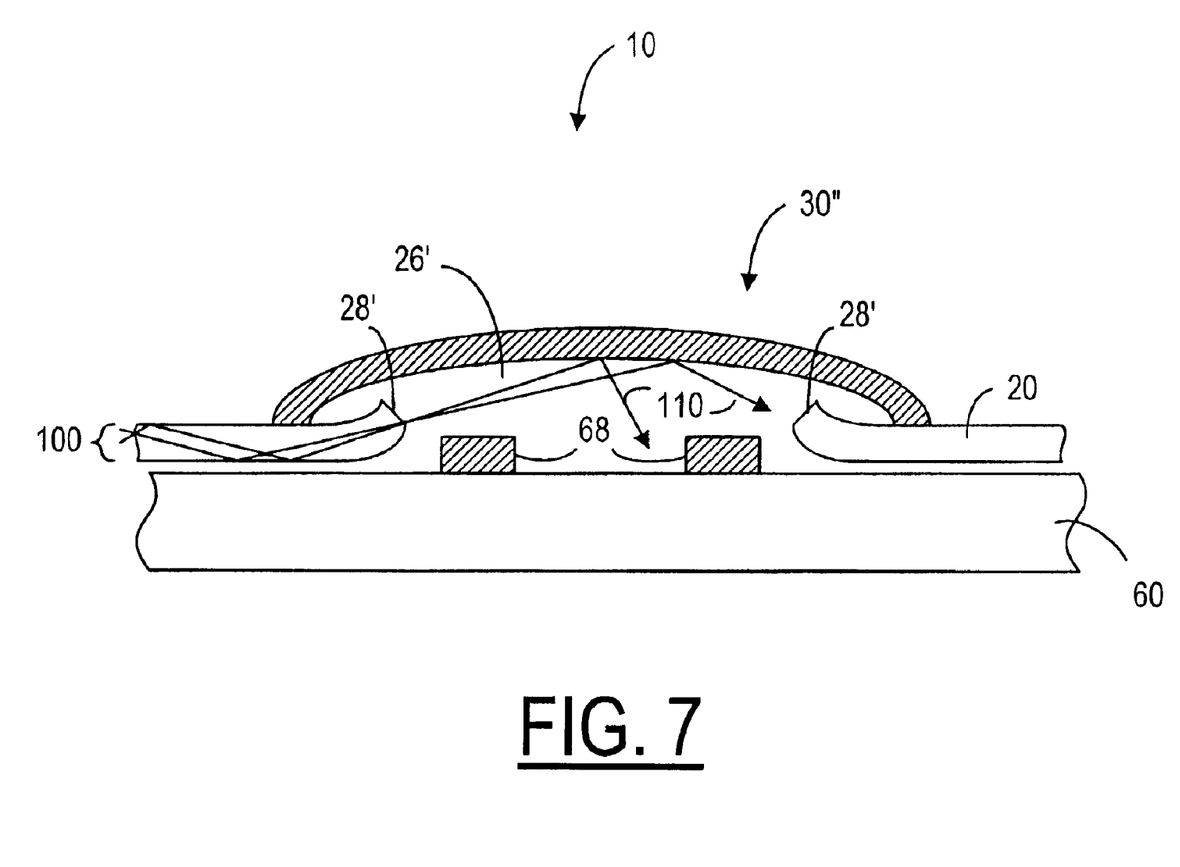
FIG. 7 is a cross sectional view showing a separate dome being used to reflect light toward the circuit board.

In the embodiments shown in FIGS. 2 to 5a, the domes 30 are an integral part of the light guide 20. As such, the light guide 20 is itself a dome sheet, or a polydome, having a plurality of individual domes formed thereon. However, it is also possible that the light guide 20 has a plurality of apertures or openings 26 to be engaged with a plurality of separate domes or touch members 30'. As such, a portion of received light 100 can escape from the light guide 20 through the peripheral surface 28 of the opening 26 to illuminate the key button 10, as shown in FIG. 6. The touch member 30' is electrically conductive and is in contact with contact areas 66 on the electrical circuit 60. The touch member 30' is used to interact with another contact area 68 on the electronic circuit 60 when the touch member 30' is pushed downward by the user, thereby electrically connecting the contact areas 66 with the contact area 68. The escaped light portion is denoted by reference numeral 108. Alternatively, the touch member 30" is a curved cover disposed above the aperture or opening 26' for reflecting light 110, which escapes the light guide 20 through the peripheral surfaces 28' to illuminate the key button 10, as shown in FIG. 7. The touch member 30" can be transparent or translucent. Preferably, the curved cover is electrically conducting or has an electrically conducting lower surface so that the touch member 30" can interact with the contact areas 68 on the electronic circuit 60 when the touch member 30" is pushed downward by the user.

Figure 8A:
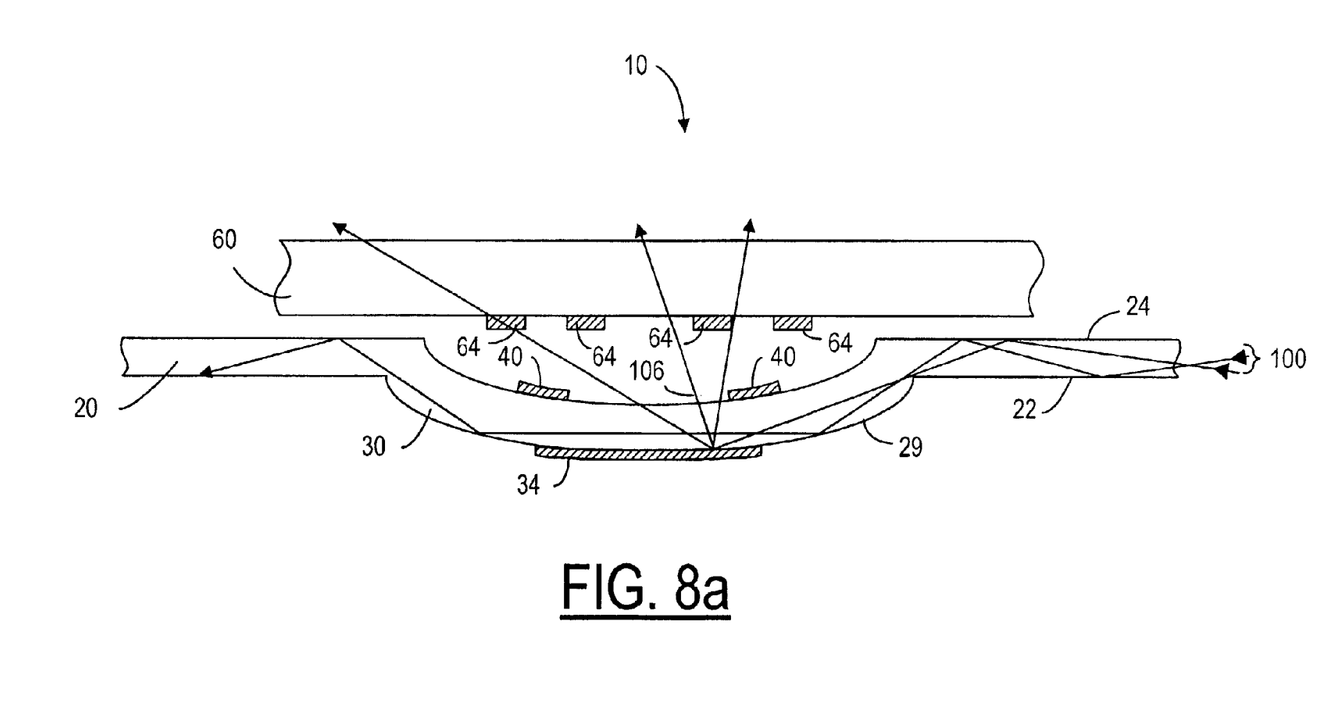
FIG. 8a is a cross-sectional view showing that the dome of FIG. 4 is placed below the electronic circuit board for illuminating the circuit.
Figure 8B:
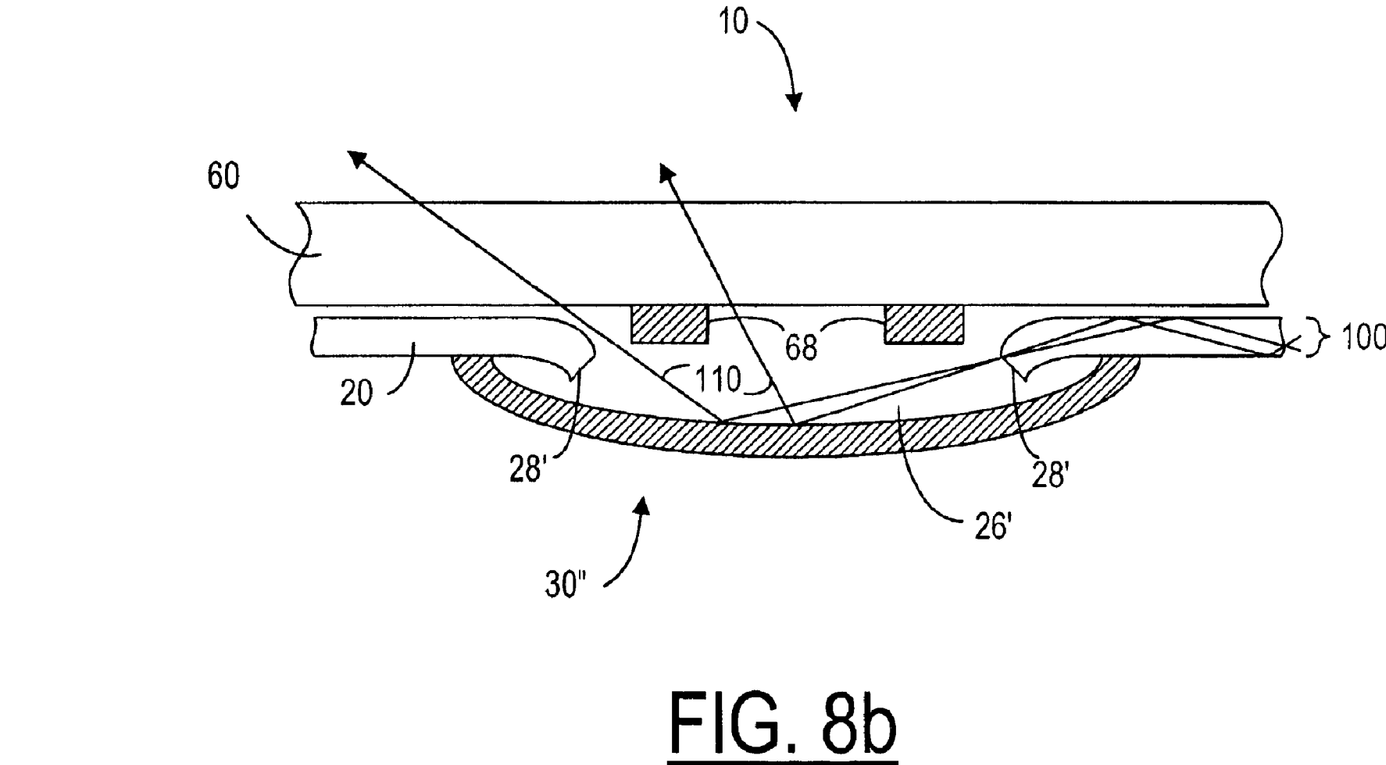
FIG. 8b is a cross-sectional view showing that the dome of FIG. 7 is placed below the electronic circuit board for illuminating the circuit.

When the electronic circuit 60 is made on a transparent or translucent substrate or board, the circuit board can be illuminated from below. Thus, the light guide 20, which is a dome sheet having one or more domes 30, can be placed below the electronic circuit 60, as shown in FIG. 8a. Likewise, the individual domes 30' along with the light guide 20 can also be placed below the electronic circuit 60, as shown in FIG. 8b. As such, light reflected from the dome 30, 30" can illuminate the key bottom 10 through the circuit 60.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A light guide for use in a hand-held electronic device having an electronic circuit, a plurality of keys to allow a user to input signals to the electronic device via the electronic circuit, and a light source capable of providing light to illuminate the device, said light guide comprising:

an optically transparent sheet, disposed adjacent to the electronic circuit, the sheet having a substantially even thickness defined by a first boundary interface, and a second boundary interface, the second boundary interface facing the electronic circuit, the sheet having an edge joining the first boundary interface and the second boundary interface, wherein the sheet comprises a plurality of dome-shaped sections for use as a plurality of touch members defining the keys and wherein the sheet is adapted to receive at least a portion of the light provided by the light source through the edge so as to allow the received light to propagate in the sheet including the dome-shaped sections between the first and second boundary interfaces, and wherein the sheet has a plurality of light escapement surfaces disposed at the touch members to allow a portion of the light received through the edge to escape from the sheet for illuminating the keys.

2. The light guide of claim 1, wherein the sheet is disposed above the electronic circuit, the first boundary interface is an upper boundary interface and the second boundary interface is a lower boundary interface facing the electronic circuit.

3. The light guide of claim 2, wherein at least one of the touch members is an integral part of the sheet, said at least one of the touch members having an upper surface and a lower surface extending from the respective boundary interfaces of the sheet for allowing the received light to enter into said at least one of the touch members and propagate therethrough between the upper and lower surfaces.

4. The light guide of claim 3, wherein said at least one of the touch members has a dome shape protruding above the upper boundary interface of the sheet, and the light escapement surface is disposed at the upper surface of the dome.

5. The light guide of claim 3, wherein said at least one of the touch members has a dome shape protruding above the upper boundary interface of the sheet, and the light escapement surface is disposed at the lower surface of the dome.

6. The light guide of claim 5, wherein the light escapement surface comprises an electrically conducting area capable of interacting with the electronic circuit for activating the keys when the user touches said at least one of the touch members.

7. The light guide of claim 3, wherein said at least one of the touch members has at least one electrically conducting area capable of interacting with the electronic circuit for activating the keys when the user touches said at least one of the touch members.

8. The light guide of claim 1, wherein the light escapement surface comprises a diffuse surface.

9. The light guide of claim 1, wherein the light escapement surface comprises a reflective surface.

10. The light guide of claim 1, wherein the light escapement surface comprises a diffractive surface.

11. The light guide of claim 1, wherein the light escapement surface comprises a plurality of microlenses.

12. The light guide of claim 2, wherein the sheet comprises at least one aperture, and said at least one of the touch members comprises a protruding segment for engaging with the aperture, and wherein the aperture has a peripheral surface joining the upper and lower boundary interfaces of the sheet to provide a light escapement surface for allowing a portion of the received light to escape through the peripheral surface to illuminate the protruding segment.

13. The light guide of claim 12, wherein at least one of the touch members includes an electrically conducting base disposed below the protruding segment, said base capable of interacting with the electronic circuit for activating the keys when the user touches said at least one of the touch members.

14. The light guide of claim 2, wherein the sheet comprises at least one aperture, and said at least one of the touch members comprises a cover disposed on top of said aperture, wherein the aperture has a peripheral surface joining the upper and lower boundary interfaces of the sheet to provide a light escapement surface for allowing a portion of the received light to escape through the peripheral surface to illuminate the cover.

15. The light guide of claim 14, wherein the cover has an electrically conducting lower surface capable of interacting with the electronic circuit for activating the keys when the user touches said at least one of the touch members.

16. The light guide of claim 14, wherein the cover is electrically conducting for interacting with the electronic circuit to activate the keys when the user touches said at least one of the touch members.

17. The light guide of claim 1, wherein the sheet is disposed below the electronic circuit, the first boundary interface is a lower boundary interface and the second boundary interface is an upper boundary interface, and wherein the electronic circuit is provided on a transparent or translucent substrate to allow the portion of the received light to illuminate the key from below the substrate.

18. A hand-held electronic device having an electronic circuit, a plurality of keys to allow a user to input signals to the electronic device via the electronic circuit, and a light source capable of providing light to illuminate the device, said hand-held electronic device composes:

a light guide coupled to the light source to receive light provided by the light source, wherein the light guide comprises an optically transparent sheet, disposed adjacent to the electronic circuit, the sheet having a substantially even thickness defined by a first boundary interface and a second boundary interface, the second boundary interface facing the electronic circuit, the sheet having an edge joining the first boundary interface and the second boundary interface, and wherein the transparent sheet comprises a plurality of dome-shaped sections for use as a plurality of touch members defining the keys and the sheet is adapted to receive at least a portion of the light provided by the light source through the edge so as to allow the received light to propagate in the sheet including the dome-shaped sections between the first and second boundary interfaces, and wherein the sheet has a plurality of light escapement surfaces disposed at the touch members to allow part of the light received through the edge to escape from the sheet for illuminating the keys.

19. The electronic device of claim 18, wherein the sheet is disposed above the electronic circuit, the first boundary interface is an upper boundary interface and the second boundary interface is a lower boundary interface facing the electronic circuit.

20. The electronic device of claim 19, wherein at least one of the touch members is an integral part of the sheet, said at least one of the touch members having an upper surface and a lower surface extending from the respective boundary interfaces of the sheet for allowing the received light to enter into said at least one of the touch members and propagate therethrough between the upper and lower surfaces.

21. The electronic device of claim 20, wherein said at least one of the touch members has a dome shape protruding above the upper boundary interface of the sheet, and the light escapement surface is disposed at the upper surface of the dome.

22. The electronic device of claim 20, wherein said at least one of the touch members has a dome shape protruding above the upper boundary interface of the sheet, and the light escapement surface is disposed at the lower surface of the dome.

23. The electronic device of claim 20, wherein the light escapement surface comprises an electrically conducting area capable of interacting with the electronic circuit for activating the keys when the user touches said at least one of the touch members.

24. The electronic device of claim 20, wherein said at least one of the touch members has at least one electrically conducting area capable of interacting with the electronic circuit for activating the keys when the user touches said at least one of the touch members.

25. The electronic device of claim 19, wherein the sheet comprises at least one aperture, and said at least one of the touch members comprises a protruding segment for engaging with the aperture, and wherein the aperture has a peripheral surface joining the upper and lower boundary interfaces of the sheet to provide a light escapement surface for allowing a portion of the received light to escape through the peripheral surface to illuminate the protruding segment.

26. The electronic device of claim 25, wherein at least one of the touch members includes an electrically conducting base disposed below the protruding segment, said base capable of interacting with the electronic circuit for activating the keys when the user touches said at least one of the touch members.

27. The electronic device of claim 19, wherein the sheet comprises at least one aperture, and said at least one of the touch members comprises a cover disposed on top of said aperture, wherein the aperture has a peripheral surface joining the upper and lower boundary interfaces of the sheet to provide a light escapement surface for allowing a portion of the received light to escape through the peripheral surface to illuminate the cover.

28. The electronic device of claim 27, wherein the cover has an electrically conducting lower surface capable of interacting with the electronic circuit for activating the keys when the user touches said at least one of the touch members.

29. The electronic device of claim 18, wherein the sheet is disposed below the electronic circuit, the first boundary interface is a lower boundary interface and the second boundary interface is an upper boundary interface, and wherein the electronic circuit is provided on a transparent or translucent substrate to allow the portion of the received light to illuminate the key from below the substrate.

30. A method of illumination for use in a hand-held electronic device having an electronic circuit, a plurality of keys for allowing a user to input signals to the electronic device via the electronic circuit, and a light source capable of providing light to illuminate the electronic device, said method comprising the steps of:
  disposing an optically transparent sheet adjacent to the electronic circuit, the sheet having a substantially even thickness defined by a first boundary interface and a second boundary interface, the second boundary interface facing the electronic circuit, the sheet having an edge joining the first boundary interface and the second boundary interface, wherein the sheet comprises a plurality of dome-shaped sections for use as a plurality of touch members defining keys;
  optically coupling the sheet to the light source to receive a portion of the light provided by the light source through the edge; and
  providing a plurality of light escapement surfaces at the touch members to allow part of the light received through the edge to escape from the sheet for illuminating the keys.

31. The method of claim 30, wherein the sheet is disposed above the electronic circuit, the first boundary interface is an upper boundary interface and the second boundary interface is a lower boundary interface facing the electronic circuit.

32. The method of claim 31, wherein at least one of the touch members is an integral part of the sheet, said at least one of the touch members having an upper surface and a lower surface extending from the respective boundary interfaces of the sheet for allowing the received light to enter into said at least one of the touch members and propagate therethrough between the upper and lower surfaces.

33. The method of claim 32, wherein said at least one of the touch members has a dome shape protruding above the upper boundary interface of the sheet, and the light escapement surface is disposed at the upper surface of the dome.

34. The method of claim 32, wherein said at least one of the touch members has a dome shape protruding above the upper boundary interface of the sheet, and the light escapement surface is disposed at the lower surface of the dome.

35. The method of claim 34, wherein the light escapement surface comprises an electrically conducting area capable of interacting with the electronic circuit for activating the keys when the user touches said at least one of the touch members.

36. The method of claim 32, wherein said at least one of the touch members has at least one electrically conducting area capable of interacting with the electronic circuit for activating the keys when the user touches said at least one of the touch members.

37. The method of claim 31, wherein the sheet comprises at least one aperture, and said at least one of the touch members comprises a protruding segment for engaging with the aperture, and wherein the aperture has a peripheral surface joining the upper and lower boundary interfaces of the sheet to provide a light escapement surface for allowing a portion of the received light to escape through the peripheral surface to illuminate the protruding segment.

38. The method of claim 37, wherein at least one of the touch members includes an electrically conducting base disposed below the protruding segment, said base capable of interacting with the electronic circuit for activating the keys when the user touches said at least one of the touch members.

39. The method of claim 31, wherein the sheet comprises at least one aperture, and said at least one of the touch members comprises a cover disposed on top of said aperture, wherein the aperture has a peripheral surface joining the upper and lower boundary interfaces of the sheet to provide a light escapement surface for allowing a portion of the received light to escape through the peripheral surface to illuminate the cover.

40. The method of claim 39, wherein the cover has an electrically conducting lower surface capable of interacting with the electronic circuit for activating the keys when the user touches said at least one of the touch members.

41. The method of claim 30, wherein the sheet is disposed below the electronic circuit, the first boundary interface is a lower boundary interface and the second boundary interface is an upper boundary interface, and wherein the electronic circuit is provided on a transparent or translucent substrate to allow the portion of the received light to illuminate the key from below the substrate.

* * * * *

UNITED STATES PATENT AND TRADEMARK OFFICE
CERTIFICATE OF CORRECTION

PATENT NO. : 6,926,418 B2  
DATED : August 9, 2005  
INVENTOR(S) : Östergård et al.

It is certified that error appears in the above-identified patent and that said Letters Patent is hereby corrected as shown below:

Column 8,
Line 34, "composes" should be -- comprises --.

Signed and Sealed this

Twenty-ninth Day of November, 2005

JON W. DUDAS
*Director of the United States Patent and Trademark Office*